United States Patent [19]
Bhatia et al.

[11] 3,774,466
[45] Nov. 27, 1973

[54] ANGLE DRIVE

[75] Inventors: Vijay H. Bhatia, West Lafayette;
Harold K. Clendenen, Lafayette, both of Ind.

[73] Assignee: TRW Inc., Cleveland, Ohio

[22] Filed: Aug. 28, 1972

[21] Appl. No.: 284,211

[52] U.S. Cl. ............................................... 74/417
[51] Int. Cl. ............................ F16h 1/14, F16h 1/20
[58] Field of Search .............................. 74/417, 423

[56] References Cited
UNITED STATES PATENTS

| | | | |
|---|---|---|---|
| 2,032,732 | 3/1936 | Zerbe | 74/417 X |
| 3,608,684 | 9/1971 | Shimanckas | 74/417 X |

*Primary Examiner*—Leonard H. Gerin
*Attorney*—Carlton Hill et al.

[57] ABSTRACT

An angle drive in which two angularly related stub shafts are interconnected by a pair of meshed gears, each of which is carried by a respective shaft, said gears being disposed in a housing with the free ends of the respective shafts extending therefrom, the housing having an opening therein through which both shafts and associated gears may be inserted, sleeves being provided for supporting the respective shafts which are threaded in respective bores in the housing for adjustment of such shafts and the gears thereon, whereby the respective gears may be larger than such bores and, if desired, integrally formed with such shafts, means being provided for locking the sleeve members in adjusted positions and for assuring lubrication of the drive.

19 Claims, 2 Drawing Figures

ANGLE DRIVE

BACKGROUND OF THE INVENTION

The invention is directed to an angle drive for transmitting rotary power from one to another of two shafts having an angular relationship with each other.

While the use of angle drives is very old, current requirements therefore, in many applications require specific design features as for example adequate adjustments for preloading compensating wear, and minimal back-lash in either direction of rotation, efficient lubrication to all bearings, preferably without requiring removal of the unit from its installation for filling, capable of construction with widely divergent angular relationships, as well as providing compact size, ease of assembly and ease of effecting adjustment. An example of one field, in which the invention is particularly applicable, is that involving steering gear linkages or drives, which in many cases conveniently may utilize an angle drive arrangement.

In prior types of construction, usually the housing is designed to receive the shafts involved, employing suitable bearings, with an opening in the housing being provided to enable mounting of the respective gears on the adjacent ends of the inserted associated shafts. The housing, in turn, was usually provided with a suitably disposed filler opening by means of which lubricant could be supplied to the housing interior, however, oftentimes requiring removal of the unit or the use of bulky standpipes etc. It will be appreciated that this type of arrangement precluded the use of integral shaft and gear elements or preassembled sub-assemblies which could be inserted, as a unit, into the housing structure.

In rare cases where such a sub-assembly was utilized, the assembly was inserted into the housing through the trunnion bores, thus requiring the latter to be greater in diameter than the outer diameter of the gears, resulting in a large and quite bulky unit.

BRIEF SUMMARY OF THE INVENTION

The present invention is therefore directed to the production of an angle drive of relatively quite simple construction but which provides all the desired features normally required in such a unit, and at the same time results in a structure of substantially minimal dimensions, as well as providing very effective means for adjustment of the gears, with respect to preloading, wear compensation, and minimal back-lash in either direction of rotation. The invention also enables the use, if desired, of integrally formed shaft and gearing as well as enabling, if desired, the observation of the gears deriving adjustment thereof.

These results are achieved in the present invention by providing relatively small, angularly related bores in the housing, each of which is adapted to receive one of the shafts with the housing being provided with an access opening through which the axes of the respective bores normally extend. Such bores may be lesser diameter than the respective gears and are adapted to receive adjusting sleeve members which support the respective shafts in operative positions with the associated gears in meshed relation. The sleeve members preferably are threaded into their associated bores for easy adjustment with respect thereto and thus adjustment of the gears relative to one another.

The sleeve members are provided with suitable channels for the flow of lubricating fluid from one end thereof to the other, and thereby also permit the housing to be filled with lubricant from adjacent the outer end of one of such sleeve members.

In a preferred form of the invention, each of the sleeve members are retained in place by means of a novel cap structure which thus may function as a jamnut operative to lock the associated sleeve member in operatively adjusted position, to cooperate with suitable sealing means for effecting a seal between the associated sleeve member and the housing, as well as provide support means for an oil seal between the shaft and cap member. Further, a suitable one of such cap members may be provided with an oil filler opening and an air relief opening therein, thereby eliminating the incorporation of additional openings in the housing itself.

BRIEF DESCRIPTION OF THE DRAWINGS

In the drawings wherein like reference characters indicate like or corresponding parts.

DETAILED DESCRIPTION OF THE INVENTION

Figure 1:
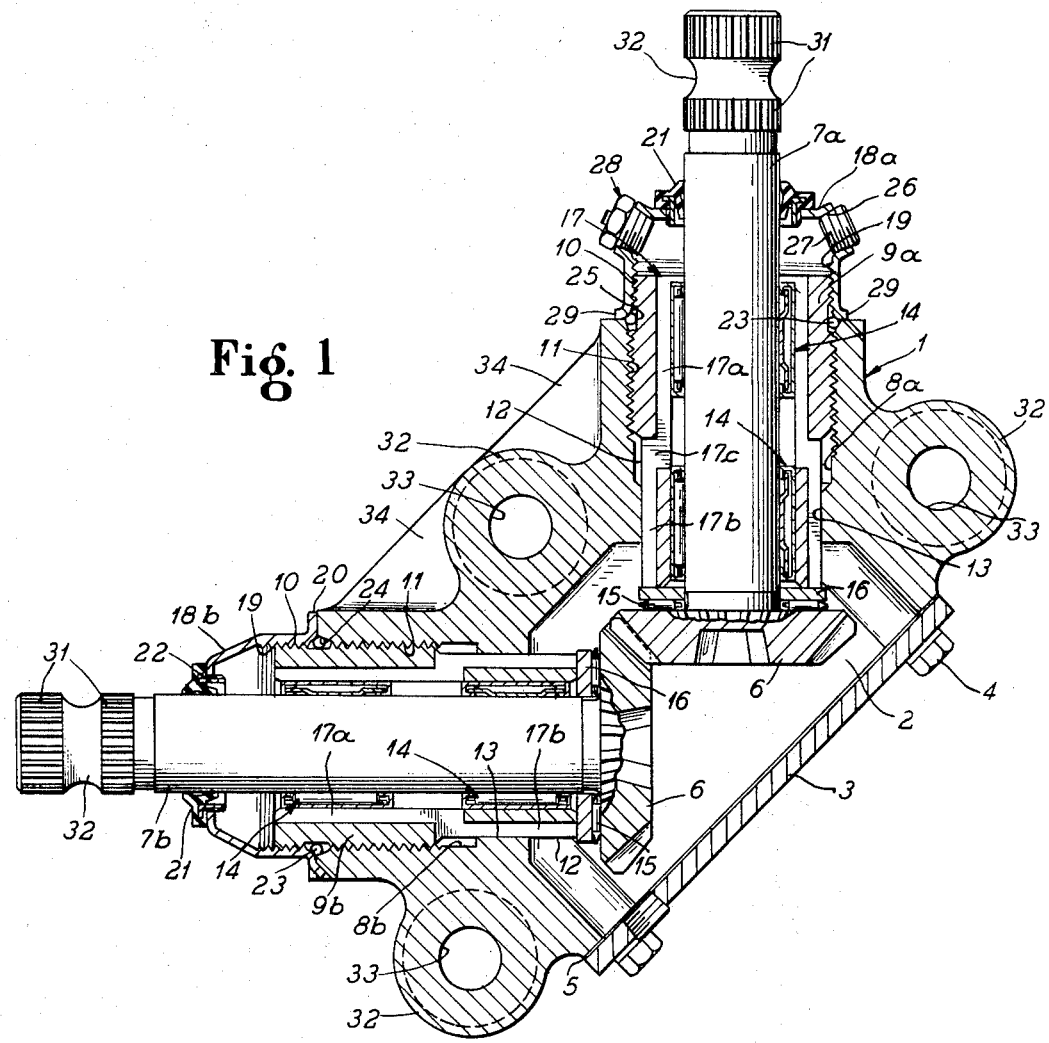
FIG. 1 is a plan section through an angle drive constructed in accordance with the present invention.
Figure 2:
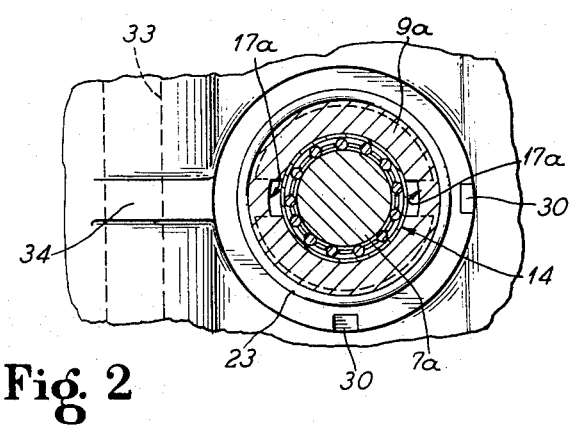
FIG. 2 is a transfer section taken approximately on the line II—II of FIG. 1.

The invention will be explained in connection with a structure example, illustrated in the drawings as employing a right angle drive and utilizing bevel gears. It will be appreciated by those skilled in the art that the invention is applicable to angle drive structures having the axes of the respective shafts at angles other than 90° and may employ gears other than bevel, for example, hypoid, beveloid, spiral bevel gears, etc. Likewise, while the angle drive structure illustrated employs a 1 : 1 ratio between the two shafts, the ratio may be widely varied in accordance with design requirements, utilizing if desirable or necessary, other types of gears.

Referring to FIG. 1 the reference numeral 1 indicates generally a housing of hollow construction forming a chamber 2 therein, and adapted to be closed by a cover plate 3 which is secured to the housing 1 by plurality of bolts 4, a suitable gasket 5 being interposed between the cover plate 3 and the adjacent peripheral edges of the housing defining the open side thereof. Disposed within the chamber 2 are a pair of cooperable meshed gears 6, illustrated as being right angle bevel gears, carried by respective shafts 7a and 7b, the axes of which extend at right angles to one another, with the shafts being disposed in respective concentric bores 8a and 8b, formed in the housing 1, and thus operatively extend from the chamber 2 to the exterior of the housing.

The shafts 7a and 7b are journaled in respective sleeve members 9a and 9b, which are externally threaded as indicated at 10 for approximately the outer axial half of the sleeve, and engaged with the internally threaded portions 11 of the bores 8. The inner end portions 12 of the respective sleeve members, as illustrated, have a diameter slightly less than that of the threaded portions 10 which extend through the restricted portions 13 of the bores 8 whereby such portions may form means for guiding and laterally supporting the respective sleeves.

As illustrated, the shafts 7a and 7b may be supported for rotary movement in suitable bearing members or assemblies respectively indicated by the reference numeral 14, each sleeve member 9 being provided with two sets of such bearings, disposed at opposite ends of the sleeve, and illustrated in the present example as roller bearing assemblies. Axial thrust on each shaft, in outward direction, is transmitted to respective thrust bearing assemblies 15 disposed, in the present example, between the near face of the associated gear 6 and a race washer 16 which is seated on the adjacent end edge of the associated sleeve 9.

The chamber 2 is adapted to form a reservoir for lubricating oil for the gears and the respective shafts etc. and to insure flow of oil to the rotating parts, as well as facilitate the supply of oil to the assembly, each sleeve member 9 is provided with a plurality of channels indicated generally by the numeral 17, each of which extends in axial direction and is divided into two sections 17a and 17b with the section 17a extending along the inner face of the sleeve opposite the threaded portion 11 thereof, and the portion 17b extending along the inner unthreaded portion of the sleeve, with the two sections being connected at their adjacent ends by the connecting channel 17c. Thus lubricant may flow from one end of the sleeve to the opposite end thereof, adequately lubricating the respective shaft and bearings as well as the meshed gears 6.

Referring to FIG. 1, it will be apparent that the externally threaded outer end portions of the respective sleeves 9 extend outwardly beyond the adjacent end of the housing 1, and they are each provided with an internally threaded, dome-shaped cap member 18a, and 18b each of which is provided with internal threads 19 and an annular radially extending outwardly directed flange 20. Each cap member 18 is also provided at the opening therein, through which the associated shaft 9 extends, with an oil seal 21 of suitable resilient material, which in the construction illustrated is provided with a tubular reinforcing member 22, operable to effectively seal the shaft with respect to the housing.

The caps 18 also function as jam-nuts for locking the associated sleeve 9 in operative position, with the joint between the housing 1 and the associated sleeve being sealed by a suitable gasket member, such as an O-ring 23 which is seated in the flared or chamfered portion 24, at the mouth of the associated bore 8, and the cooperable annular groove 25 formed in the circumference of the associated sleeve, with the O-ring 23 being compressed by the flange 20 on the cap 18, into sealing engagement with the adjacent parts. The chamber 2, bearing structures 14 and associated gear 6 are adapted to be supplied with lubricating oil, the filler opening for which may be conveniently placed in one of the cap members 18, along with a suitable air relief valve operable to facilitate the evacuation of air from the interior when the device is being filled with lubricating oil. Thus in the example illustrated, it is assumed that the shaft 7a will extend vertically, as depicted, in which case the cap member 18a may be provided with a filler opening 26, adapted to be normally closed by a removable plug 27, and with an air release valve, indicated generally by the numeral 28, of common construction and adapted to provide a port through which air may be vented during the filling operation.

To enable the cap members 18 to effectively perform the function of a jam-nut, they may each be constructed for engagement with a suitable tool or wrench by means of which they may be firmly turned down into engagement with the housing to lock the associated sleeve 9 in adjusted position. For example, the flanges 20 may be cut away at opposite sides thereof, to form a pair of flats 29 (as illustrated with respect to the cap 18a) whereby the cap may be firmly engaged thereat with a suitable wrench, which in the case of the cap member 18b may be either of open end or box construction, while that for use with the cap member 18a, in view of the filler and vent openings therein, may be of open end construction. To insure the rigid locking of each cap member to the housing and thus eliminate the possible loosening of the cap member during operation of the device, portions of the housing defining the end faces at the respective bores 8 may be provided with one or more notches or recesses 30, into which the overlying portion of the flange 20 of the associated cap member may be deformed or swedged as illustrated with respect to the cap 18b.

As the wrench-engaging means on the cap members, in the example illustrated, comprise a pair of flats formed on the flanges 20, at diametrically opposite sides of the flange, two such notches are employed spaced 90° apart. Thus irrespective of the final positions of the flats 29 at least one of the notches 30 will be covered by the remainder of the flange, so that irrespective of the position of the cap member a portion of the flange thereof will always overlie at least one of the notches 30. In the event, for example, that the wrench engaging structure on the cap is otherwise constructed as for example by producing a hex-configuration in the cap, whereby a continuous flange 20, may be employed, only a single notch 30 may be provided.

The free outer ends of the shafts 7, may be suitably constructed for rigid engagement with driving and driven members, the construction illustrated being provided with respective splined end portions 31 on each shaft for engagement with mating splined bores on associated driven and driving members. The latter may be rigidly fixed in axial position of the shaft ends by suitable means, for example pins carried by such members and extending tangentially to the annular slots 32, formed on each shaft, a common expedient for such purposes.

Suitable mounting means may be provided for supporting the drive in operative position from a suitable supporting member, the particular construction of which will depend upon the application. In the particular embodiment illustrated, such mounting means is in the form of suitable mounting lugs 32 extending transverse to the common plane of the shafts 7a, 7b, each of which lugs is provided with a bore 33 for the receipt of a cooperable mounting bolt. If desired the housing may also be provided with a diagonally extending reinforcing rib 34.

The structure illustrated in the drawings may be assembled in the following manner:

With the cover plate 3 unmounted, the free end of one of the shafts 7 may be inserted through the access opening of the chamber 2 and through the desired bore 8 to an approximate position such as illustrated in FIG. 1 and the associated sleeve applied thereto and partially threaded into the threaded portion of the bore 8. The chamber 2 is of a size to permit the insertion of the shaft and gear thereon into the associated bore a distance sufficient to permit free clearance for insertion of the outer shaft and gear into its cooperable bore of the housing, after which the respective sleeves may be turned inwardly into the housing until they assume the approximate positions illustrated in FIG. 1. It will be particularly noted that extremely accurate adjustment of the bevel gears 6 may be effected as the meshing of such gears may be visually determined through the access opening and it therefore is unnecessary for the adjuster to effect a "blind" adjustment i.e. by "feel." Following the adjustment of the sleeves, the O-rings 23 may be placed in operative position and the preformed caps 18 with assembled shaft seals 21 may be threaded down on the exposed threaded end of the associated sleeve, compressing the O-rings 23 to seal the joint between the housing and the sleeve, and at the same time rigidly lock the sleeves in operative adjusted positions. Following this operation the cap members 18 may be rigidly interlocked with the housing by deformation of the flange 20 into the cooperable notch 30. Following such assembly of the shaft and gear structures, the cover member 3 and cooperable gasket 5 may be mounted by means of the bolts 4.

The interior of the structure may then be filled with lubricating oil through the filler opening 26, with the air relief valve 28 providing adequate venting, and the lubricating oil flowing through the respective channels 17 to insure lubrication of the respective shaft bearings and gears.

It will be appreciated that the angle drive described is very flexible in its practical application, as the angles between the driven and driving shafts may be varied throughout a wide range, and where desirable or necessary, other types of gears may be employed, as previously mentioned.

It will be particularly noted that in addition to the ability to utilize integrally connected gear and shaft assemblies, or prior assembled sub-assemblies of shafts and gears, the overall size of the structure may be reduced to substantially a bare minimum consistent with the overall size of the gearing. At the same time the present invention provides a very efficient design for insuring adequate lubrication and in which refills may be made without removal of the unit. Likewise, the present invention enables the elimination of a bulky or unsightly stand pipe or the like for venting or refilling purposes.

Having thus described our invention it is obvious that although minor modifications might be suggested by those versed in the art, it should be understood that we wish to embody within the scope of the patent warranted hereon all such modifications as reasonably and properly come within the scope of our contribution to the art.

We claim:

1. An angle drive comprising a pair of stub shafts, a housing having a pair of bores therein, disposed on respective axes extending in intersecting directions, each bore being adapted to receive one of said shafts, each of the latter being provided with a gear rigidly connected therewith, shaft and gear to form a uniting structure, said gears being constructed to operatively mesh for the transmission of rotary movement of one shaft to the other, the gear of at least one of said gear structures being greater in overall diameter than the associated bore, said housing having an opening therein of a size and location to permit insertion of each unitary shaft and gear structure there through into operative position with respect to the associated bore, means for operatively closing said opening, a respective sleeve member for each shaft, disposed in the associated bore with the cooperable shaft journaled in such sleeve member, each of the latter being constructed to support the gear of the associated shaft and gear structure in meshed relation with respect to the other gear and means for retaining said sleeves in operative positions, in their respective bores.

2. A drive according to claim 1, wherein each of said sleeves is provided with passageways therein extending in axial direction, forming channels for the flow of lubricant from one end of the sleeve to the other.

3. A drive according to claim 2, wherein each of said sleeves is threaded adjacent the outer end thereof.

4. A drive according to claim 1, wherein the shaft axes intersect and extend through said housing openings, 5. A drive according to claim 1, wherein both gears having overall diameters greater than the diameter of said bores, and are inserted into the housing through the opening therein.

6. A drive according to claim 1, wherein each of said sleeves is provided with anti-friction bearings for supporting the respective shaft.

7. A drive according to claim 1, wherein a thrust bearing is disposed between each gear and the adjacent end of the associated sleeve.

8. A drive according to claim 1, wherein said sleeve-retaining means comprises internal threads in the respective bores, cooperably engageable with external threads on the associated sleeve.

9. A drive according to claim 2, wherein said sleeves each are of a length to project from the associated bore, and a jam-nut threaded on the projecting portion of the associated sleeve for locking the latter in adjusted position relative to the housing.

10. A drive according to claim 9, wherein said jam-nut is in the form of a hollow cap member through which the associated shaft extends, and means on each cap member engageable with the associated shaft to provide an oil seal therebetween.

11. A drive according to claim 10, wherein said housing is adapted, in operative position, to dispose one of said cap members at the uppermost portion thereof, such cap member having an oil filler opening and an air relief opening therein, and closure means for such respective openings.

12. A drive according to claim 9, wherein each of said bores is provided with a flared mouth, each sleeve having an annular circumferential groove therein, of an axial length to be disposed opposite such flared mouth throughout the adjustment range of the sleeve, and an annular resilient sealing ring, partially disposed in said flared mouth and said groove, adapted to be compressed into sealing relation with said sleeve and housing by engagement of said jam-nut with said sealing ring.

13. A drive according to claim 12, wherein each of said sleeves is provided with passageways therein extending in axial direction, forming channels for the flow of lubricant from one end of the sleeve to the other.

14. A drive according to claim 13, wherein each of said sleeves is threaded adjacent the outer end thereof, said lubricant channels extending along the inner faces of said sleeves at their outer threaded portions, and along the outer faces of the inner end portions of said sleeves.

15. A drive according to claim 14, wherein each of said sleeves is provided with anti-friction bearings for supporting the respective shaft.

16. A drive according to claim 15, wherein a thrust bearing is disposed between each gear and the adjacent end of the associated sleeve.

17. A drive according to claim 16, wherein the shaft axes intersect each other and extend through said housing openings.

18. A drive according to claim 17, wherein both gears having overall diameters greater than the diameter of said bores, and are inserted into the housing through the opening therein.

19. A drive according to claim 1, wherein each of said gears is integrally formed with its associated shaft.

* * * * *